United States Patent
Nouri

(10) Patent No.: US 9,878,672 B2
(45) Date of Patent: Jan. 30, 2018

(54) CARGO ATTACHMENT SYSTEM AND METHOD OF MAKING AND USING THE SAME

(71) Applicant: GM Global Technology Operations LLC, Detroit, MI (US)

(72) Inventor: Homan Nouri, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 38 days.

(21) Appl. No.: 14/710,972

(22) Filed: May 13, 2015

(65) Prior Publication Data
US 2016/0332580 A1 Nov. 17, 2016

(51) Int. Cl.
*B60R 7/04* (2006.01)
*B60R 7/00* (2006.01)

(52) U.S. Cl.
CPC .............. *B60R 7/043* (2013.01); *B60R 7/005* (2013.01)

(58) Field of Classification Search
CPC ................................. B60R 7/043; B60N 3/004
USPC ........ 224/275, 570, 925, 543, 554; 211/175; 296/37.16; 297/188.01, 188.04–188.06
See application file for complete search history.

(56) References Cited

U.S. PATENT DOCUMENTS

| | | | | |
|---|---|---|---|---|
| 4,739,528 A * | 4/1988 | Allen | ..................... | B60P 7/0876 296/100.15 |
| 5,769,294 A * | 6/1998 | Heinz | ....................... | B60R 7/02 224/544 |
| 5,848,816 A * | 12/1998 | Hancock | ................... | B65G 7/12 294/15 |
| H001834 H * | 2/2000 | Wilson | .................... | B60J 3/0234 296/97.11 |
| 6,227,756 B1 * | 5/2001 | Dube | ...................... | A47B 57/54 211/175 |
| 6,315,180 B1 * | 11/2001 | Watkins | .................. | B60R 11/04 224/275 |
| 6,321,960 B1 * | 11/2001 | Ellis | ........................ | B60K 37/00 224/274 |
| 6,585,465 B1 * | 7/2003 | Hammond | ............ | B60P 7/0815 410/104 |
| 6,846,140 B2 * | 1/2005 | Anderson | ............. | B60P 7/0815 410/102 |
| 7,234,619 B2 * | 6/2007 | Hicks | ....................... | B60N 3/00 224/281 |
| 7,980,614 B2 * | 7/2011 | Denton | ..................... | B60R 7/04 296/24.3 |
| 8,182,426 B2 * | 5/2012 | Zhao | ........................ | A61B 8/00 361/679.21 |

(Continued)

Primary Examiner — Justin Larson
Assistant Examiner — Phillip Schmidt
(74) Attorney, Agent, or Firm — BrooksGroup

(57) ABSTRACT

A number of variations may include a product comprising: a cargo attachment system having: a base unit comprising an attachment piece, and a rail comprising a slide face; and a cargo attachment mechanism comprising a knob, a cargo attachment component, and a slider mechanism mechanically coupled to the slide face wherein the slider mechanism is constructed and arranged to slide the cargo attachment mechanism along the slide face and statically lock the cargo attachment mechanism at a position along the slide face, and wherein the cargo attachment component is constructed and arranged to pivotally rotate into a plurality of fixed positions about the knob.

18 Claims, 7 Drawing Sheets

(56) References Cited

U.S. PATENT DOCUMENTS

| | | | |
|---|---|---|---|
| 8,240,628 B2* | 8/2012 | Huang | F16M 11/041 |
| | | | 248/122.1 |
| 8,733,830 B2* | 5/2014 | Sanchez | B60N 2/4838 |
| | | | 297/188.03 |
| 9,045,096 B2* | 6/2015 | Procter | B60R 11/0235 |
| 2009/0084922 A1* | 4/2009 | Martin | B60R 7/043 |
| | | | 248/339 |
| 2011/0109129 A1* | 5/2011 | Brill | B60N 3/004 |
| | | | 297/188.04 |

* cited by examiner

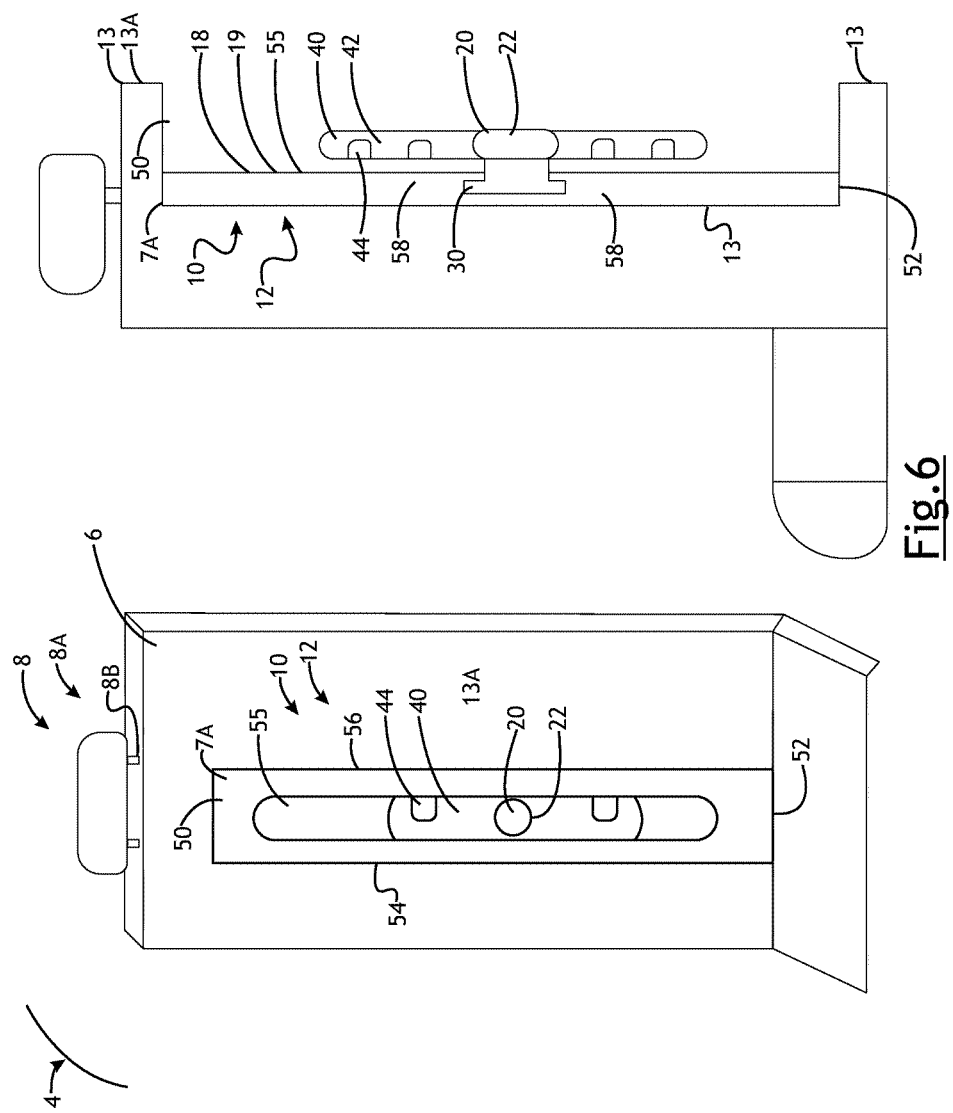

CARGO ATTACHMENT SYSTEM AND METHOD OF MAKING AND USING THE SAME

TECHNICAL FIELD

The field to which the disclosure generally relates to includes cargo attachments and method of making and using the same.

BACKGROUND

Currently, some cargo attachments may be used in vehicles including, but not limited to, sport utility vehicles (SUVs).

SUMMARY OF ILLUSTRATIVE VARIATIONS

A number of variations may include a product having a cargo attachment system comprising: a base unit comprising an attachment piece, and a rail comprising a slide face; and a cargo attachment mechanism comprising a knob, a cargo attachment component, and a slider mechanism mechanically coupled to the slide face wherein the slider mechanism is constructed and arranged to slide the cargo attachment mechanism along the slide face and statically lock the cargo attachment mechanism at a position along the slide face, and wherein the cargo attachment component is constructed and arranged to pivotally rotate into a plurality of fixed positions about the knob.

A number of variations may include a method including providing a cargo attachment system comprising: a base unit comprising an attachment piece, and a rail comprising a slide face; and a cargo attachment mechanism comprising a knob, a cargo attachment component, and a slider mechanism mechanically coupled to the slide face wherein the slider mechanism is constructed and arranged to slide the cargo attachment mechanism along the slide face and statically lock the cargo attachment mechanism at a position along the slide face, and wherein the cargo attachment component is constructed and arranged to pivotally rotate into a plurality of fixed positions about the knob; attaching the attachment piece to a vehicle; and operating the cargo attachment system to house cargo within the vehicle.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 6 illustrates a cargo attachment system and method of making and using a cargo attachment system according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 1:
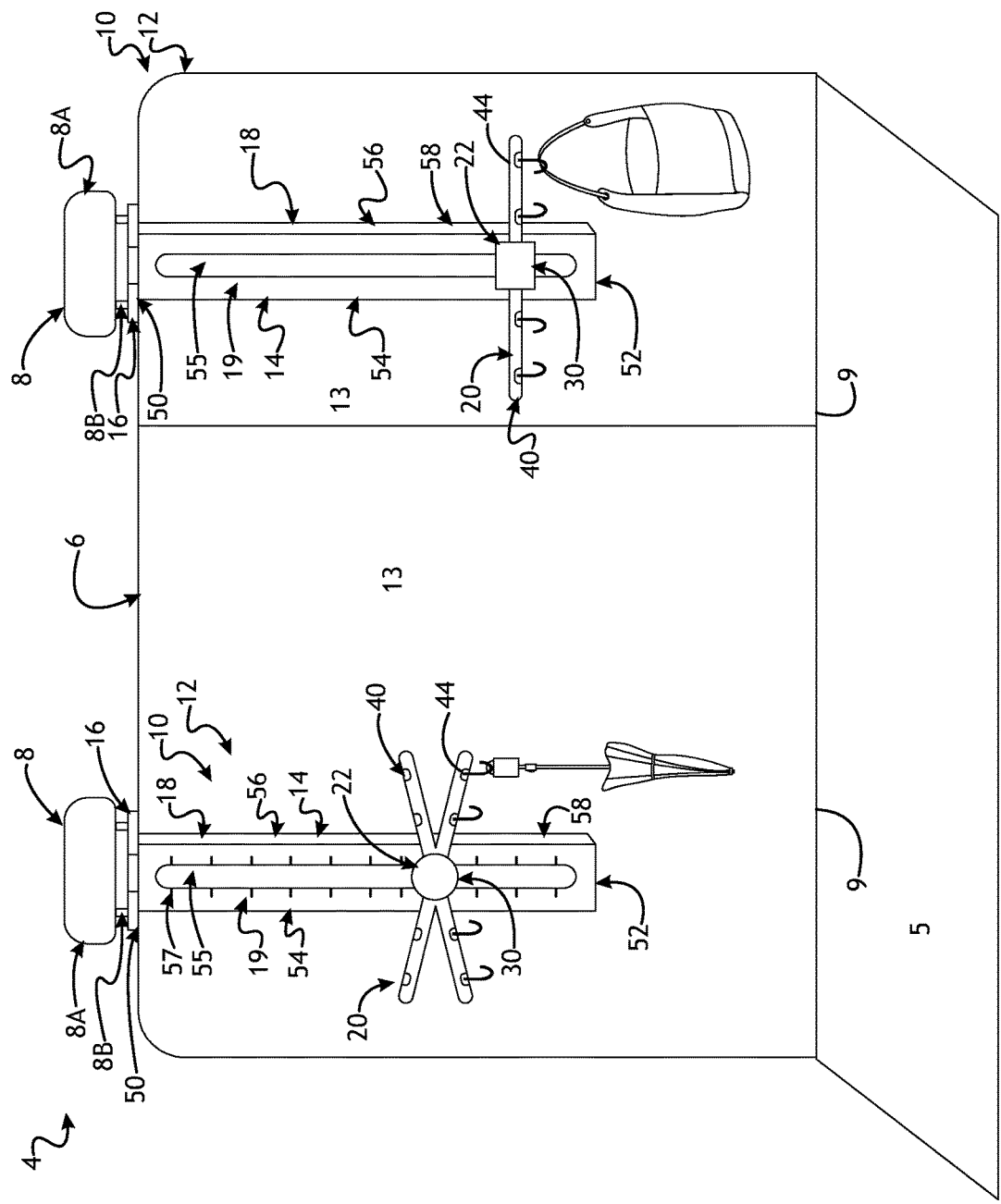
FIG. 1 illustrates a cargo attachment system according to a number of variations.

FIG. 1 illustrates a number of variations. In a number of variations, a product 10 is shown. In a number of variations, the product 10 may include a cargo attachment system 12. In a number of variations, the cargo attachment system 12 may include a base unit 14. In a number of variations, the base unit 14 may include an attachment piece 16. In a number of variations, the base unit 14 may include a rail 18 including a slide face 19. In a number of variations, the cargo attachment system 12 may include a cargo attachment mechanism 20. In a number of variations, the cargo attachment mechanism 20 may include a knob 22. In a number of variations, the cargo attachment mechanism 20 may include a slider mechanism 30. In a number of variations, the slider mechanism 30 may be mechanically coupled to the slide face 19. In a number of variations, the slider mechanism 30 may be constructed and arranged to slide the cargo attachment mechanism 20 along the slide face 19 of the base unit 14. In a number of variations, the slider mechanism 30 may be constructed and arranged to statically lock the cargo attachment mechanism 20 at a position along the slide face 19. In a number of variations, the cargo attachment mechanism 20 may include a cargo attachment component 40. In a number of variations, the cargo attachment component 40 may be constructed and arranged to pivotally rotate into a plurality of fixed positions about the knob 22. In a number of variations, the cargo attachment component 30 may be constructed and arranged to pivotally rotate 360° about the knob 22. In a number of variations, the cargo attachment system 12 may attach to a vehicle 4. In a number of variations, the vehicle 4 may include passenger vehicles, motor cycles, bicycles, rough terrain vehicles, watercraft, trains, aircraft, spacecraft, or may be another type. In a number of variations, the vehicle 4 may include at least one vehicle seat 6 and may include an interior floor 5. In a number of variations, the vehicle seat 6 may include a vehicle seat headrest 8 including a headrest pad 8A and at least one headrest post 8B. In a number of variations, at least one of the cargo attachment component 40, knob 22 or slider mechanism 30 may be constructed and arranged to statically lock the cargo attachment component 40 into a horizontal position relative to the interior floor 5 of the vehicle 4. In a number of variations, at least one of the cargo attachment component 40, knob 22 or slider mechanism 30 may be constructed and arranged to statically lock the cargo attachment component 40 into a vertical position relative to the interior floor 5 of the vehicle 4.

Still referring to FIG. 1, in a number of variations, the cargo attachment system 12 may comprise a plurality of components, including, but not limited to, the base unit 14, including the attachment piece 16 or rail 18; and the cargo attachment mechanism 20, including the knob 22, cargo attachment component 40, and slider mechanism 30, may be comprised of a metal, ceramic, polymer, textile, or may be another type. In a number of variations, the cargo attachment system 12, including any of its components, may be metal in the form of an element, compound, or alloy. In a number of variations, the base unit 14 metal may comprise titanium, steel, cast iron, alloy steel, stainless steel, platinum, palladium, aluminum, copper, nickel, iron, lead, tin, cobalt, bronze, or may be another type. In a number of variations, the cargo attachment system 12, including any of its components, may comprise a ceramic including, but not limited to, barium titanate, glass, cement, bismuth strontium calcium copper oxide, boron nitride, earthenware, stoneware, clay, ferrite, lead zirconate titanate, magnesium diboride, porcelain, sialon, silicon carbide, silicon nitride, steatite, titanium carbide, zinc oxide, zirconium oxide, zirconia, or may be another type. In a number of variations, the cargo attachment system 12, including any its components, may comprise a textile comprising an animal textile, a plant textile, a mineral textile, or a synthetic textile. In one variation, the cargo attachment system 12, including any of its components, may comprise a plurality of fibers. The fibers may be textile, natural or synthetic or may be another type. The fibers may include animal, vegetable, or mineral fibers including, but not limited to, alpaca, angora, byssus, camel hair, cashmere, catgut, chiengora, guanaco, llama, mohair, pashmina, qiviut, rabbit, silk, sinew, spider silk, wool, vicuna, yak, abaca', bagasse, balsa, bamboo, coir, cotton, flax, hemp, jute, kapok, kenaf, pina, raffia, ramie, sisal, wood, asbestos, acetate, triacetate, art silk, lyocell rayon, modal rayon, rayon, glass, silica, carbon, basalt, metallic, acrylic, aramid (including Twaron, Kevlar, Technora, Nomax), microfiber, modacrylic, nylon, olefin, polyester, polyethylene, spandex, vinylon, vinyon, zylon, saran, carbon-fiber-reinforced polymer, carbon-fiber-reinforced plastic, carbon-fiber reinforced thermoplastic, or carbon nanotube reinforced polymer, fiber reinforced polymer, fiberglass (including E-glass, A-glass, E-CR-glass, C-glass, D-glass, R-glass, F-glass, S-glass, S-2-glass, Hexel, or may be another type), basalt, or may be another type. In a number of variations, the cargo attachment system 12, including any of its components, may comprise a composite material including, but not limited to, a fiber-reinforced polymer, a thermoplastic composite, a metal matrix composite, a ceramic matrix composite, an organic matrix composite, a fiber-reinforced composite, a polyester, a vinyl ester, an epoxy, a phenolic polymer, a polyimide polymer, a polyamide polymer, a polypropylene, PEEK, or may be another type. In a number of variations, the cargo attachment system 12, including any of its components, may comprise a polymer including, but not limited to, Acrylonitrile butadiene styrene (ABS), Acrylic (PMMA), Celluloid, Cellulose acetate, Cycloolefin Copolymer (COC), Ethylene-Vinyl Acetate (EVA), Ethylene vinyl alcohol (EVOH), Fluoroplastics (including PTFE, FEP, PFA, CTFE, ECTFE, ETFE) Ionomers, Kydex™, a trademarked acrylic/PVC alloy, Liquid Crystal Polymer (LCP), Polyacetal (POM or Acetal), Polyacrylates (Acrylic), Polyacrylonitrile (PAN or Acrylonitrile), Polyamide (PA or Nylon), Polyamide-imide (PAI), Polyaryletherketone (PAEK or Ketone), Polybutadiene (PBD), Polybutylene (PB), Polybutylene terephthalate (PBT), Polycaprolactone (PCL), Polychlorotrifluoroethylene (PCTFE), Polyethylene terephthalate (PET), Polycyclohexylene dimethylene terephthalate (PCT), Polycarbonate (PC), Polyhydroxyalkanoates (PHAs), Polyketone (PK), Polyester, Polyetheretherketone (PEEK), Polyetherketoneketone (PEKK), Polyetherimide (PEI), Polyethersulfone (PES), Polysulfone, Polyethylenechlorinates (PEC), Polyimide (PI), Polylactic acid (PLA), Polymethylpentene (PMP), Polyphenylene oxide (PPO), Polyphenylene sulfide (PPS), Polyphthalamide (PPA), Polystyrene (PS), Polysulfone (PSU), Polytrimethylene terephthalate (PTT), Polyurethane (PU), Polyvinyl acetate (PVA), Polyvinyl chloride (PVC), Polyvinylidene chloride (PVDC), Styrene-acrylonitrile (SAN), polycarbonate+acrylonitrile butadiene styrene mix (ABS+PC), Polypropylene (PP) (including, but not limited to, impact, random, and homo), Polyethylene (PE) (including, but not limited to, linear low density, linear high density), combinations or blends in any amount thereof, or may be another type. In a number of variations, the cargo attachment system 12 including any of its components, may be formed individually, or together, by casting, molding (including powder metallurgy, plastic forming, shrink fitting, or may be another type), forming (including end tube forming, forging, rolling, extrusion, pressing, bending, shearing, ironing, spinning, or may be another type), machining (including milling, turning, drilling, reaming, shaping, sawing, tapping, broaching, planning, honing, finishing, routing, or may be another type), joining (including welding, brazing, soldering, sintering, adhesive bonding, fastening, stitching, or may be another type), additive manufacturing, or may be formed a different way. In a number of variations, the cargo attachment system 12 components may be assembled together to form the complete cargo attachment system 12 by any of these processes.

Figure 2:
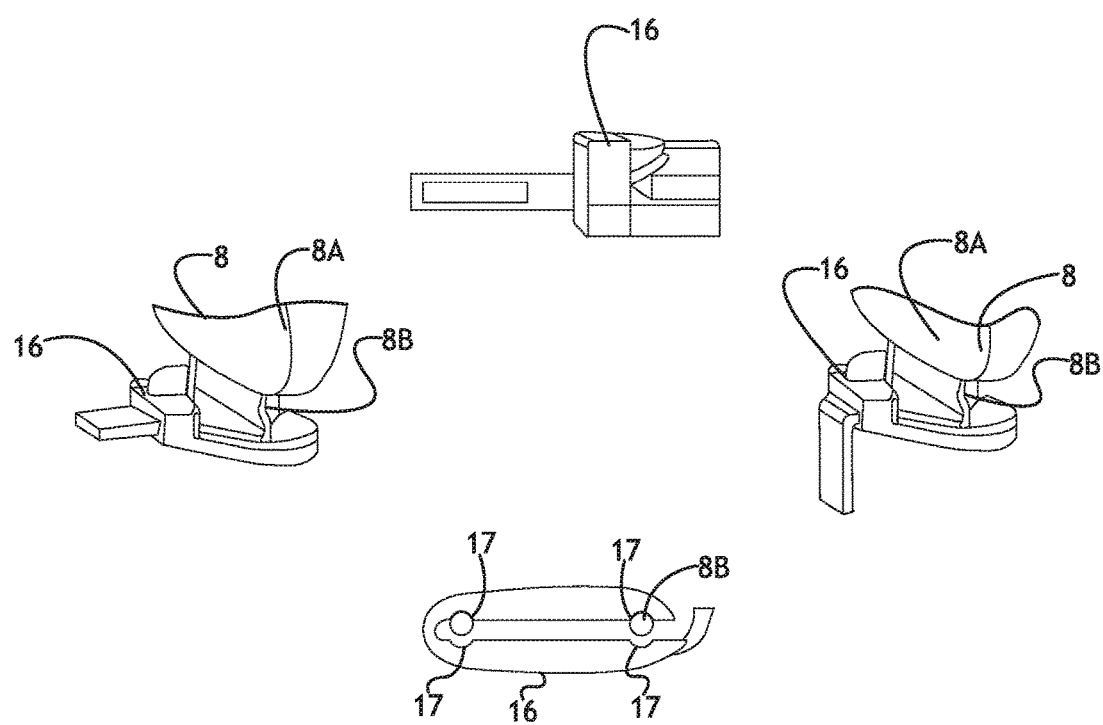
FIG. 2 illustrates a cargo attachment system and method of making and using a cargo attachment system according to a number of variations.
Figure 4:
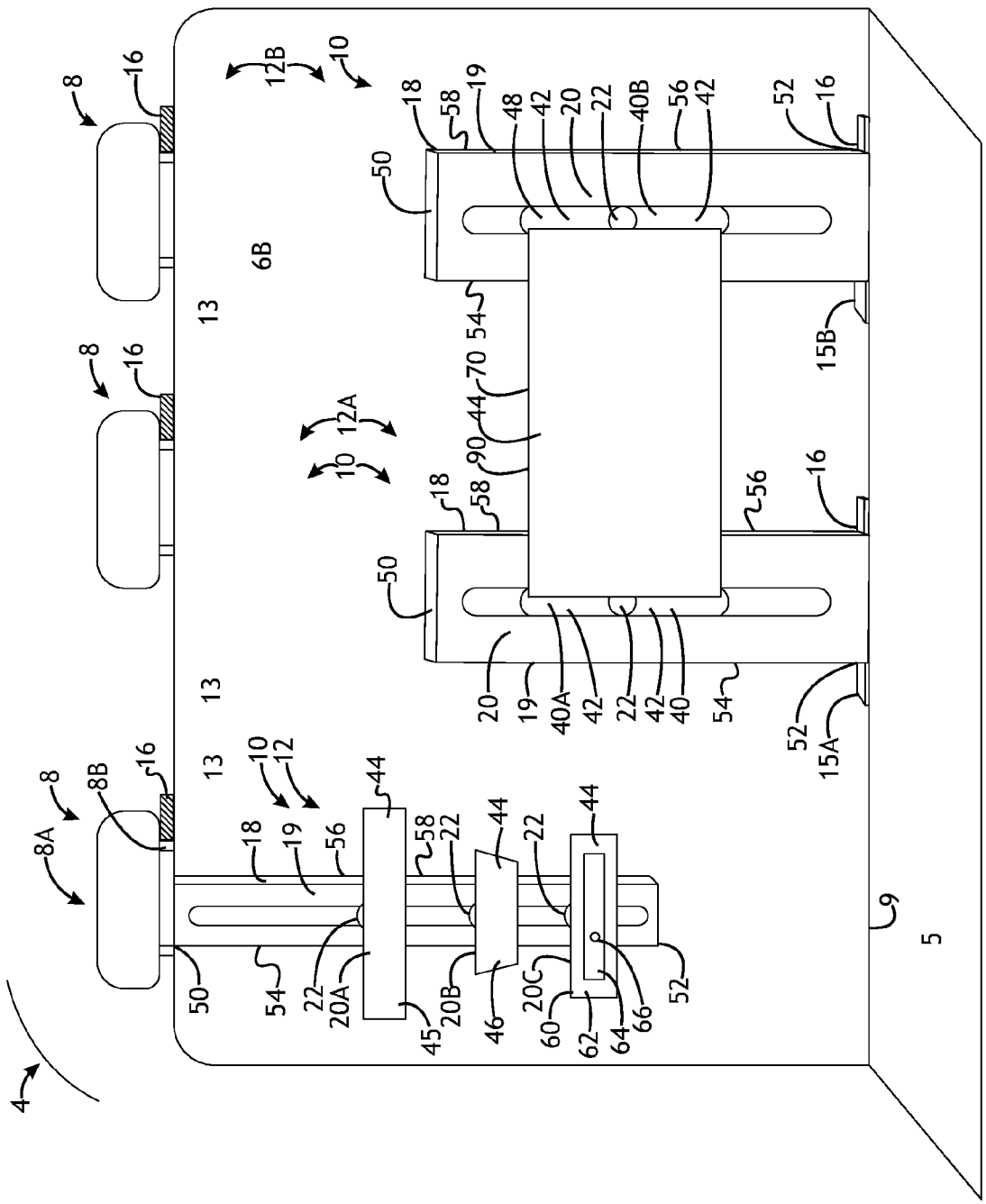
FIG. 4 illustrates a cargo attachment system and method of making and using a cargo attachment system according to a number of variations.

Still referring to FIG. 1 and now referring to FIG. 2, in a number of variations, the cargo attachment system 12 may include a base unit 14. In a number of variations, the base unit 14 may include an attachment piece 16. In a number of variations, the attachment piece 16 may include a spring-loaded hook attachment. In a number of variations, the attachment piece 16 may include at least one of a bolt, fastener, buckle, button, cable tie, clamp, clip, clutch, flange, frog, grommet, latch, nail, peg, pin, hook and loop fastener, rivet, screw anchor, snap fastener, staple, stitch, strap, threaded fastener, Velcro, tie, toggle bolt, zipper, wedge anchor, or may be another type. In a number of variations, the attachment piece 16 may allow for easy detachment from a vehicle 4. In a number of variations, the attachment piece 16 may attach the cargo attachment system 12 to a headrest 8 (including, but not limited to the headrest pad 8A or headrest post 8B) of a vehicle seat 6 to hold the cargo attachment system 12 flush against the back 13 of the vehicle seat 6. In a number of variations, the attachment piece 16 may attach to the sides of the vehicle seat 6 itself. As shown in FIG. 4, in a number of variations, the attachment piece 16 may attach to a base 9 of a vehicle seat 6 through a base flange 15 that goes into the seat to hold the cargo attachment system 12 flush against the back 13 of the vehicle seat 6. In a number of variations, the attachment piece 16 may comprise a u shape. In a number of variations, the attachment piece may clamp to the headrest 8. As shown in FIG. 2, in a number of variations, the attachment piece 16 may include a plurality of protrusions or indentions 17 that fit around at least one post 8B of the headrest 8 to secure the cargo attachment system 12 to the vehicle 4. As shown in FIG. 4, in a number of variations, the attachment piece 16 may be a textile piece with Velcro or a zipper to secure the cargo attachment system 12 to the vehicle 4.

Still referring to FIG. 1, in a number of variations, the base unit 14 may include a rail 18. In a number of variations, the rail 18 may include a slide face 19. In a number of variations, the rail 18 may have a top 50, a bottom 52, a left side 54 and a right side 56. In a number of variations, the rail 18 may have a groove 55 that runs the length of the rail 18 from the top 50 to the bottom 52 along the slide face 19. In a number of variations, the groove 55 may form a T-shape. In a number of variations, the slide face 19 of the rail 18 may include a plurality of notches 57 along its length. In a number of variations, the rail has a width 58. In a number of variations, the rail 18 or slide face 19 may include different cross-sectional shapes depending on the application of the cargo attachment system 12 including, but not limited to, a circle, a triangle, a parallelogram, a square, a rhombus, a pentagon, a pentacle, a hexagon, a polygon, or may be another shape. In a number of variations, the rail 18 or slide face 19 may be curved along its length. In a number of variations, the base unit 14 may include both the attachment piece 16 and the rail 18 as a single piece or material.

Figure 3C:
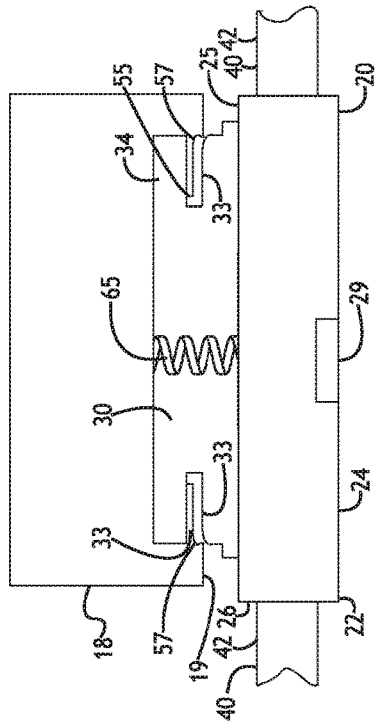
FIGS. 3A-3D illustrate a cargo attachment system and method of making and using a cargo attachment system according to a number of variations.
Figure 3D:
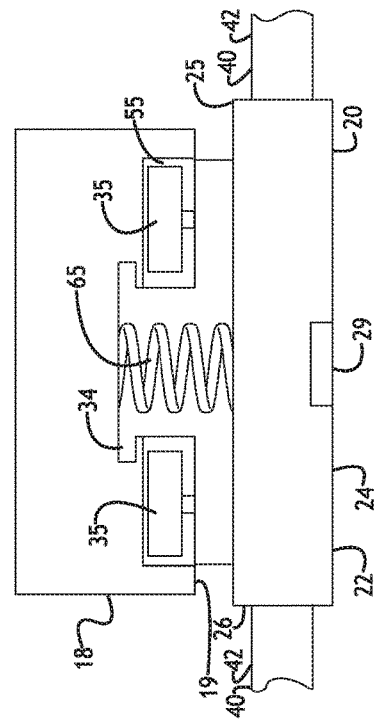
Figure 3A:
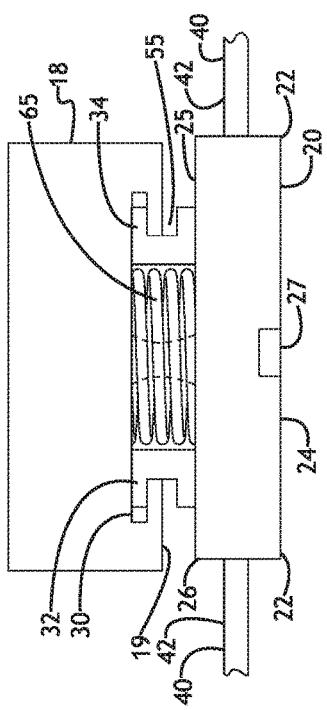
Figure 3B:
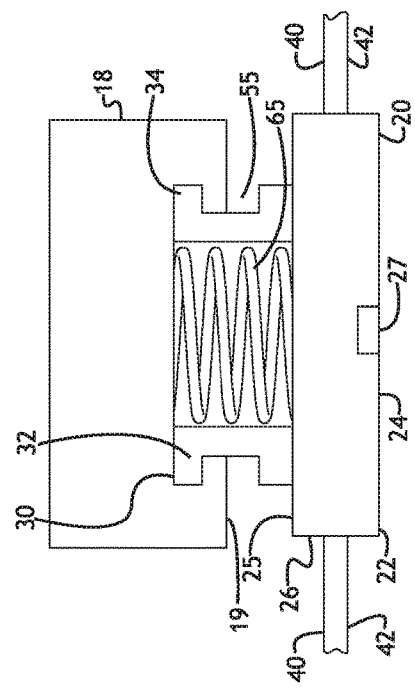

Still referring to FIG. 1 and now referring to FIGS. 3A-3D, in a number of variations, the cargo attachment system 12 may include a cargo attachment mechanism 20. In a number of variations, the cargo attachment mechanism 20 may include a knob 22. In a number of variations, the knob 22 may include a light 27 that may be a push light, or may be turned on by a different means. In a number of variations, the knob 22 may include a face 24, a back 25, and a width 26. In a number of variations, the face 24 may include different cross-sectional shapes depending on the application of the cargo attachment system 12 including, but not limited to, a circle, a triangle, a parallelogram, a square, a rhombus, a pentagon, a pentacle, a hexagon, a polygon, or may be another shape. In a number of variations, the knob 22 may allow for the cargo attachment mechanism 20 to easily slide up and down the rail 18 depending on the size of the cargo attached to the cargo attachment mechanism 20. In a number of variations, actuation of the knob 22 may allow for the cargo attachment mechanism 20 to lock into a fixed position along the length of the rail 18. In a number of variations, actuation of the knob 22 may include turning, tightening, locking, pressing, clamping, or may include another type. As shown in FIGS. 3A-B, the turning, pressing, or clamping of the knob 22 may tighten a spring 65 that fixes the cargo attachment mechanism 20 to a fixed static position on the rail 18. In a number of variations, the knob 22 may contain a handle 29.

Referring to FIGS. 1 and 3A-3D, in a number of variations, the cargo attachment mechanism 20 may contain a slider mechanism 30. In a number of variations, the slider mechanism may couple to the knob 22, cargo attachment component 40 or both. In a number of variations, the slider mechanism 30 may mechanically couple to the slide face 19 of the rail 18. In a number of variations, the slider mechanism 30 may be constructed and arranged to slide the cargo attachment mechanism 20 along the slide face 19 of the rail 18. In a number of variations, the slider mechanism 30 may include a slider protrusion 32 that couples to the rail 18 of the base unit 14. In a number of variations, the slider protrusion 32 may slide within the groove 55 of the rail 18 on the slide face 19. As shown in FIG. 3C, in a number of variations, the slider protrusion 32 may include at least one edge 33 that fits within the notches 57 of the slide face 19 to fix the cargo attachment mechanism 20 more easily. As shown in FIG. 3D, in a number of variations, the slider protrusion 32 may include a set of wheels 35 to easily move the slider mechanism 30 along the rail 18. In a number of variations, the slider mechanism 30 may include a lubrication agent 33 to easily move the slider mechanism 30 along the rail 18 within the groove 55. In a number of variations, the slider protrusion 32 may include at least one slider prong 34 that fits inside the groove 55 of the rail 18. In a number of variations, the slider protrusion 32 may include two prongs 34 that fit inside the groove 55. In a number of variations, actuation of the slider mechanism 30 may allow for the cargo attachment mechanism 20 to lock into a fixed position along the length of the rail 18. In a number of variations, actuation of the slider mechanism 30 may include turning, tightening, locking, pressing, clamping, or may include another type.

Figure 5A:
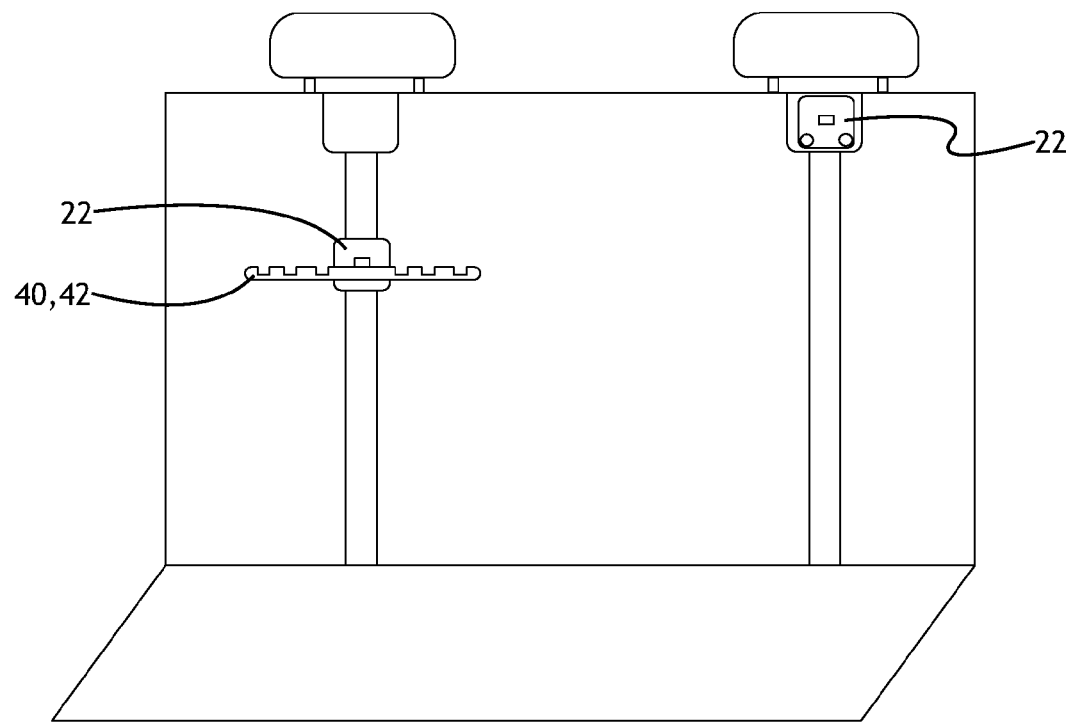
FIGS. 5A-5B illustrate a cargo attachment system and method of making and using a cargo attachment system according to a number of variations.
Figure 5B:
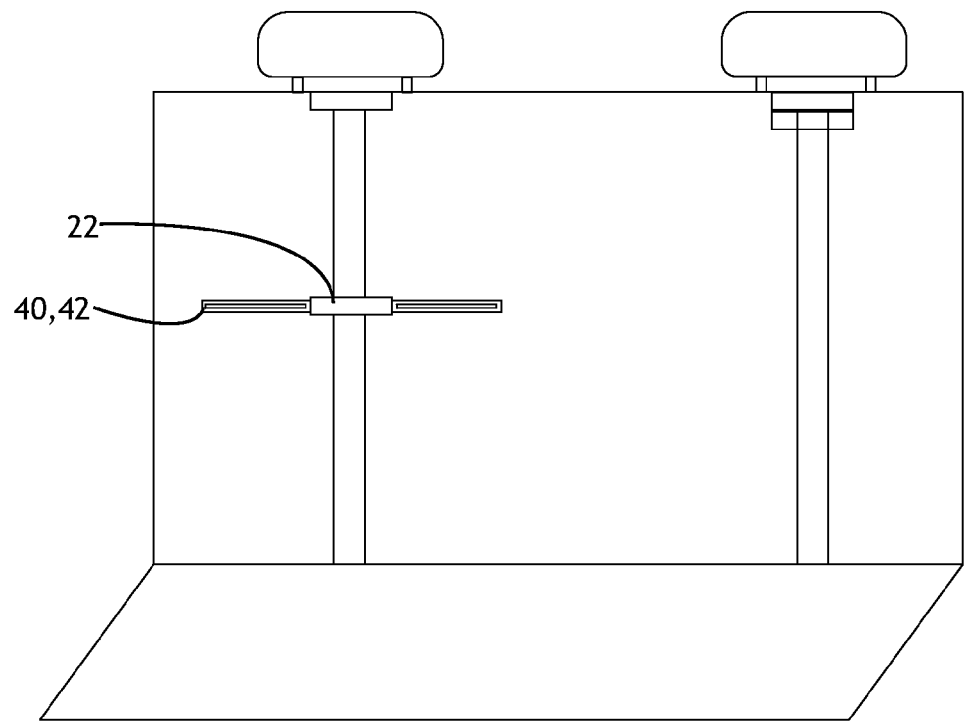

As shown in FIGS. 1-6, in a number of variations, the cargo attachment mechanism 20 may contain a cargo attachment component 40. As shown in FIG. 4, in a number of variations, the cargo attachment system 12 may include a plurality of cargo attachment mechanisms 20A, 20B, 20C, on a base unit 14. In a number of variations, the cargo attachment component 40 may couple to the knob 22, slider mechanism 30 or both. In a number of variations, the cargo attachment component 40 may include at least one projection arm 42 that projects radially away from the knob 22 and slider mechanism 30. In a number of variations, the cargo attachment component 40 may be locked so that the projection arm 42 projects radially away from the knob 20 and slider mechanism 30 in a horizontal position relative to the vehicle floor 5. As shown in FIG. 4, in a number of variations, the cargo attachment component 40 may be locked so that the projection arm 42 projects radially away from the knob 20 and slider mechanism 30 in a vertical position relative to the vehicle floor 5. In a number of variations, the projection arm 42 may include a cargo holder 44. In a number of variations, the cargo holder 44 may attach or hold to cargo within a vehicle 4. In a number of variations, the cargo may include, but is not limited to, shopping bags, garments, hats, shoes, umbrellas, safety kits, pet supplies, child supplies, medical kits, or may be another type. In a number of variations, the cargo holder 44 may include at least one of a bolt, fastener, buckle, button, cable tie, clamp, clip, clutch, flange, frog, grommet, latch, nail, peg, pin, hook and loop fastener, rivet, screw anchor, snap fastener, staple, stitch, strap, threaded fastener, Velcro, tie, toggle bolt, zipper, wedge anchor, or may be another type. In a number of variations, the cargo holder 44 may include a platform 45. In a number of variations, the cargo holder 44 may include a cup holder 46. In a number of variations, the cargo holder 44 may include a compartment 60 that may include a compartment housing 62, a compartment door 64, and a compartment handle 66. As shown in FIG. 5, in a number of variations, at least one of the projection arms 42 or the cargo holder 44 may adjust, fold, or slide to fit within the knob 20. In a number of variations, the cargo holder 44 may hold the cargo such that it sits on an interior floor 5 of a vehicle 4, which may allow for less movement of the cargo while the vehicle 4 is in motion. In a number of variations, adjustment of the height of the cargo attachment mechanism 20 relative to the interior floor 5 of a vehicle 4 may allow for restriction of movement of the cargo while the vehicle 4 is in motion. In a number of variations, at least one of the cargo attachment component 40, knob 22 or slider mechanism 30 may be coupled to at least one of the other two components (cargo attachment component 40, knob 22 or slider mechanism 30).

As shown in FIG. 4, in a number of variations, the product 10 or vehicle 6 may include a plurality of cargo attachment systems 12A, 12B. In a number of variations, the vehicle 6 may include two cargo attachment systems 12A, 12B that may be mechanically coupled to the headrests 8*i*, 8*ii* of two separate vehicle seats 6A, 6B. In a number of variations, the vehicle may include two cargo attachment systems 12A, 12B that may be mechanically coupled to the vehicle seats 6A, 6B, through two base flanges 15A, 15B. In a number of variations, the product 10 or vehicle 6 may further include a cargo bag 70. In a number of variations, the cargo bag 70 may be attached to the projection arms 42A, 42B of the cargo attachment components 40A, 40B of the two separate cargo attachment systems 12A, 12B. In a number of variations, the cargo bag 70 may open outward from the back 13 of the vehicle seat 6 toward the rear of the vehicle 6. In a number of variations, the cargo bag 70 may run the length of the individual rails 18A, 18B of the two cargo attachment systems 12A, 12B. In a number of variations, the cargo bag 70 may contain a zipper, tie, or Velcro attachment 90.

In a number of variations, the cargo attachment system 12 may be integrated into a frame of the vehicle seat 6. In a number of variations, in FIG. 6, the vehicle seat 6 may have a back 13 that may have a groove 7A cut into it. In a number of variations, the cargo attachment system 12 may fold or be stowed within the back 13 of the vehicle seat 6 so that it may be flush with or ingressed into the back face 13A of the vehicle seat in a crevice formed within the back 13 of the vehicle seat 6. In a number of variations, the base unit 14 of the cargo attachment system 12 may be coupled to the groove 7A of the rear 7 of the vehicle seat 6. In a number of variations, the cargo attachment mechanism 20 may be folded within the groove 7A of the rear 7 of the vehicle seat 6 when the cargo attachment system 12 is in a stowed position. In a number of variations, the cargo attachment system 12 may be detached from the vehicle 6 and stowed under the interior floor 5 of the vehicle 4.

Figure 7:
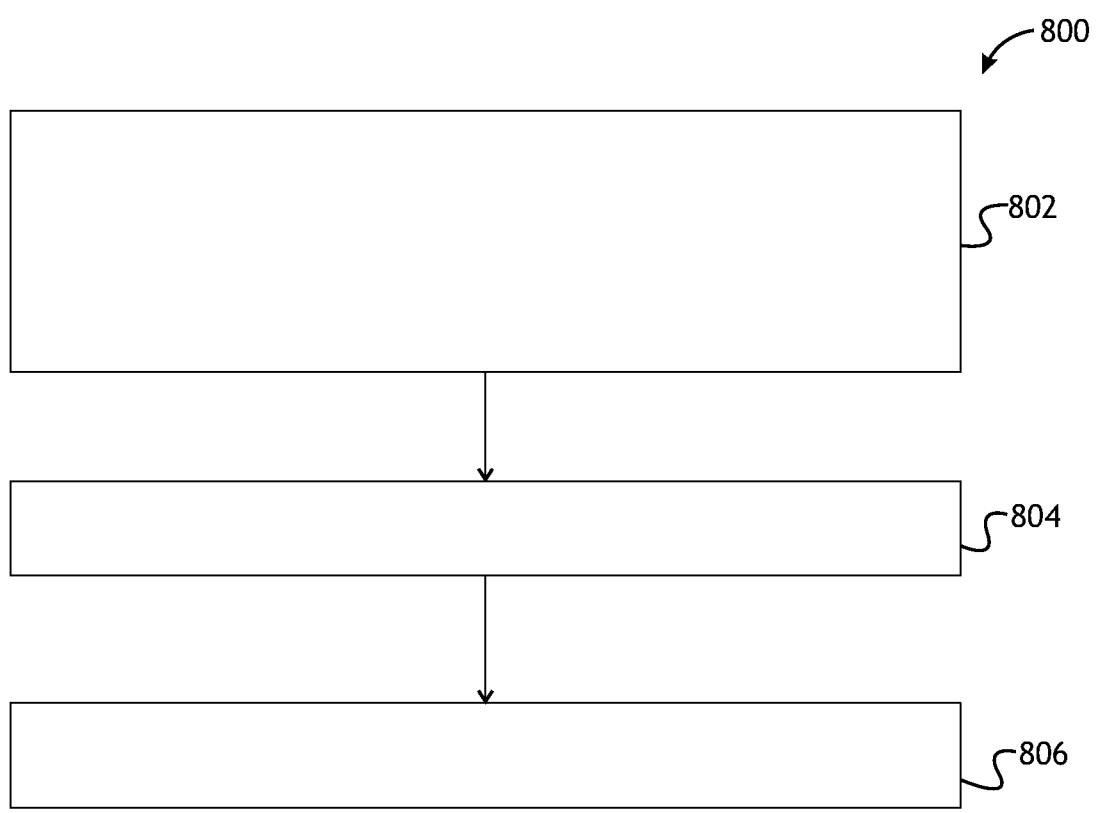
FIG. 7 illustrates a cargo attachment system and method of making and using a cargo attachment system according to a number of variations.

As shown in FIG. 7, in a number of variations, a method 800 may be shown wherein the method in block 802 includes providing a cargo attachment system 12 comprising: a base unit 14 comprising an attachment piece 16, and a rail 18 comprising a slide face 19; and a cargo attachment mechanism 20 comprising a knob 30, a cargo attachment component 40, and a slider mechanism 30 mechanically coupled to the slide face 19 wherein the slider mechanism 30 may be constructed and arranged to slide the cargo attachment mechanism 20 along the slide face 19 and statically lock the cargo attachment mechanism 20 at a position along the slide face, and wherein the cargo attachment component 40 is constructed and arranged to pivotally rotate into a plurality of fixed positions about the knob 20. In a number of variations, the method 800 in block 804 further includes attaching the attachment piece 16 to a vehicle 4. In a number of variations, the method 800 in block 806 further includes operating the cargo attachment system 12 to house cargo within the vehicle 4.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product including: a cargo attachment system comprising: a base unit comprising an attachment piece, and a rail comprising a slide face; and a cargo attachment mechanism comprising a knob, a cargo attachment component, and a slider mechanism mechanically coupled to the slide face wherein the slider mechanism is constructed and arranged to slide the cargo attachment mechanism along the slide face and statically lock the cargo attachment mechanism at a position along the slide face, and wherein the cargo attachment component is constructed and arranged to pivotally rotate into a plurality of fixed positions about the knob.

Variation 2 may include a product as set forth in Variations 1 wherein the attachment piece attaches the cargo attachment system to a headrest of a vehicle seat.

Variation 3 may include a product as set forth in any of Variations 1-2 wherein the cargo attachment component comprises an arm comprising at least one hook.

Variation 4 may include a product as set forth in any of Variations 1-3 wherein the cargo attachment component comprises a platform.

Variation 5 may include a product as set forth in any of Variations 1-4 wherein the cargo attachment component comprises a compartment comprising a housing, a door, and a handle.

Variation 6 may include a product as set forth in any of Variations 1-5 wherein the product further comprises a second cargo attachment system.

Variation 7 may include a product as set forth in Variation 6 wherein the product further comprises a cargo bag that attaches to each of the cargo attachment components of the first cargo attachment system and second cargo attachment system respectively.

Variation 8 may include a product as set forth in Variations 1-7 wherein the attachment piece comprises a spring-loaded hook attachment.

Variation 9 may include a product as set forth in any of Variations 1-8 wherein the cargo attachment system resides within a groove within the back of a vehicle seat.

Variation 10 may include a product as set forth in any of Variations 1-9 wherein the cargo attachment component is housed within the knob in a stowed position.

Variation 11 may include a method including providing a cargo attachment system comprising: a base unit comprising an attachment piece, and a rail comprising a slide face; and a cargo attachment mechanism comprising a knob, a cargo attachment component, and a slider mechanism mechanically coupled to the slide face wherein the slider mechanism is constructed and arranged to slide the cargo attachment mechanism along the slide face and statically lock the cargo attachment mechanism at a position along the slide face, and wherein the cargo attachment component is constructed and arranged to pivotally rotate into a plurality of fixed positions about the knob; attaching the attachment piece to a vehicle; and operating the cargo attachment system to house cargo within the vehicle.

Variation 12 may include a method as set forth in Variation 11 wherein the attachment piece attaches the cargo attachment system to a headrest of a vehicle seat.

Variation 13 may include a method as set forth in and of Variations 11-12 wherein the cargo attachment component comprises an arm comprising at least one hook.

Variation 14 may include a method as set forth in any of Variations 11-13 wherein the cargo attachment component comprises a platform.

Variation 15 may include a method as set forth in any of Variations 11-14 wherein the cargo attachment component comprises a compartment comprising a housing, a door, and a handle.

Variation 16 may include a method as set forth in any of Variations 11-15 wherein the product further comprises a second cargo attachment system.

Variation 17 may include a method as set forth in Variation 16 wherein the product further comprises a cargo bag that attaches to each of the cargo attachment components of the first cargo attachment system and second cargo attachment system respectively.

Variation 18 may include a method as set forth in any of Variations 11-17 wherein the attachment piece comprises a spring-loaded hook attachment.

Variation 19 may include a method as set forth in any of Variations 12-18 wherein the cargo attachment system resides within a groove within the back of a vehicle seat.

Variation 20 may include a method as set forth in any of Variations 11-19 wherein the cargo attachment component is housed within the knob in a stowed position.

Variation 21 may include a method, and/or a product as set forth in any of Variations 1-20 wherein the cargo attachment component is be constructed and arranged to pivotally rotate about the knob.

Variation 22 may include a method, and/or a product as set forth in any of Variations 1-21 wherein at least one of the cargo attachment component, knob or slider mechanism is constructed and arranged to statically lock the cargo attachment component into a horizontal position relative to a interior floor of a vehicle.

Variation 23 may include a method, and/or a product as set forth in any of Variations 1-22 wherein at least one of the cargo attachment component, knob or slider mechanism is constructed and arranged to statically lock the cargo attachment component into a vertical position relative to a interior floor of a vehicle.

Variation 24 may include a method, and/or a product as set forth in any of Variations 1-23 wherein the cargo attachment system may attach to a vehicle comprising at least one of passenger vehicles, motor cycles, bicycles, rough terrain vehicles, watercraft, trains, aircraft, or spacecraft.

Variation 25 may include a method, and/or a product as set forth in any of Variations 1-24 wherein the cargo attachment system comprises at least one of a metal, ceramic, polymer, a composite material, or a textile Variation 26 may include a method, and/or a product as set forth in any of Variations 1-25 wherein the attachment piece comprises at least one of a bolt, fastener, buckle, button, cable tie, clamp, clip, clutch, flange, frog, grommet, latch, nail, peg, pin, hook and loop fastener, rivet, screw anchor, snap fastener, staple, stitch, strap, threaded fastener, Velcro, tie, toggle bolt, zipper, or wedge anchor.

Variation 26 may include a method, and/or a product as set forth in any of Variations 24-25 wherein the attachment piece attaches to a base of a vehicle seat.

Variation 27 may include a method, and/or a product as set forth in any of Variations 1-26 wherein the rail has a groove that runs the length of the rail along the slide face.

Variation 28 may include a method, and/or a product as set forth in any of Variations 1-27 wherein the slide face of the rail has a plurality of notches along its length.

Variation 29 may include a method, and/or a product as set forth in any of Variations 1-28 wherein the rail is curved along its length.

Variation 30 may include a method, and/or a product as set forth in any of Variations 1-29 wherein the attachment piece and rail are a single piece or material.

Variation 31 may include a method, and/or a product as set forth in any of Variations 1-30 wherein the knob includes a push light Variation 32 may include a method, and/or a product as set forth in any of Variations 1-31 wherein the slider mechanism includes a slider protrusion.

Variation 33 may include a method, and/or a product as set forth in any of Variations 1-32 wherein the slider mechanism includes a lubrication agent.

Variation 34 may include a method, and/or a product as set forth in any of Variations 1-33 wherein actuation of the slider mechanism fixes the cargo attachment mechanism into a fixed position along the length of the rail.

Variation 35 may include a method, and/or a product as set forth in any of Variations 1-34 wherein the cargo attachment component includes at least one projection arm that projects radially away from the knob and may be adjustable to either a horizontal position or vertical position relative to the interior floor of the vehicle.

Variation 36 may include a method, and/or a product as set forth in any of Variations 1-35 wherein the cargo attachment component includes a cargo holder comprising at least one of a bolt, fastener, buckle, button, cable tie, clamp, clip, clutch, flange, frog, grommet, latch, nail, peg, pin, hook and loop fastener, rivet, screw anchor, snap fastener, staple, stitch, strap, threaded fastener, Velcro, tie, toggle bolt, zipper, or wedge anchor.

Variation 37 may include a method, and/or a product as set forth in any of Variations 1-36 wherein cargo holder is a cupholder.

The above description of select variations within the scope of the invention is merely illustrative in nature and, thus, variations or variants thereof are not to be regarded as a departure from the spirit and scope of the invention.

What is claimed is:

1. A product comprising: a cargo attachment system comprising: a vehicle seat that has a back, a headrest attached to the vehicle seat, a base unit comprising an attachment piece that is attached to the headrest, and a rail extending from the attachment piece downward along the back, the rail comprising a slide face; and a cargo attachment mechanism comprising a knob, an arm projecting from the knob, a cargo attachment component, and a slider mechanism mechanically coupled to the slide face wherein the slider mechanism is constructed and arranged to slide the cargo attachment mechanism along the slide face positioning the cargo attachment component at a selected height along the back and statically lock the cargo attachment mechanism at a position along the slide face, and wherein the cargo attachment component is constructed and arranged to pivotally rotate the arm into a plurality of fixed positions about the knob and further comprising a groove formed in the back wherein the cargo attachment system is positionable within the groove with the arm stowed in the groove inboard from the back.

2. A product as set forth in claim 1 comprising a floor disposed on a side of the seat on the back, wherein the projection arm extends over the floor so that the cargo attachment component is positionable at the selected height above the floor.

3. A product as set forth in claim 1 wherein the cargo attachment component comprises a second arm projecting from the knob and disposed on an opposite side of the knob from the first arm, wherein each of the arms includes a plurality of spaced apart hooks as the cargo attachment component.

4. A product as set forth in claim 1 wherein the cargo attachment component comprises a cargo holder in the form of a platform formed by the arm, and extending across the back.

5. A product as set forth in claim 1 wherein the cargo attachment component comprises a compartment formed by the arm and comprising a housing, a door closing the compartment, and a handle on the door.

6. A product as set forth in claim 1 wherein the product further comprises a second cargo attachment system spaced apart from the first cargo attachment system.

7. A product as set forth in claim 6 wherein the product further comprises a cargo bag that attaches to each of the cargo attachment components of the first cargo attachment system and second cargo attachment system respectively.

8. A product as set forth in claim 1 wherein the attachment piece comprises a spring-loaded hook attachment.

9. A product as set forth in claim 1 wherein the cargo attachment component is positionable into the knob for housing in a stowed position.

10. A method comprising:
   providing a cargo attachment system comprising: a base unit comprising an attachment piece, and a rail comprising a slide face; and a cargo attachment mechanism comprising a knob, a cargo attachment component, and a slider mechanism mechanically coupled to the slide face, constructing the slider mechanism to slide the cargo attachment mechanism along the slide face and statically lock the cargo attachment mechanism at a position along the slide face, and constructing the cargo attachment component to pivotally rotate into a plurality of fixed positions about the knob;
   providing a vehicle with a seat that has a back;
   attaching the attachment piece to the seat;
   operating the cargo attachment system to house cargo at a selected height on the back, including sliding the cargo attachment mechanism along the slide face and vertically on the back; and
   forming a groove within the back, rotating the cargo attachment component into alignment with the grove, and stowing the cargo attachment system within the groove.

11. A method as set forth in claim 10 comprising attaching the cargo attachment system to a headrest of the seat with the attachment piece.

12. A method as set forth in claim 10 comprising providing first and second arms projecting from the knob opposite one another, and providing at least one hook on each of the arms.

13. A method as set forth in claim 10 comprising providing the cargo attachment component as a platform formed by the arm.

14. A method as set forth in claim 10 comprising providing the cargo attachment component as a compartment, forming the compartment with a housing, providing a door that closes the compartment, and providing a handle on the door.

15. A method as set forth in claim 10 comprising providing a second cargo attachment system, and spacing the second cargo attachment system from the first cargo attachment system.

16. A method as set forth in claim 15 comprising providing a floor behind the seat at the back, suspending a cargo bag between the cargo attachment components and above the floor, attaching the cargo bag to each of the cargo attachment components of the first cargo attachment system and second cargo attachment system respectively, and adjusting the cargo attachment components to a height where the cargo bag extends to and is supported by the floor.

17. A method as set forth in claim 10 comprising providing the attachment piece as a spring-loaded hook attachment.

18. A method as set forth in claim 10 comprising sliding the cargo attachment component into the knob so that the cargo attachment component is housed within the knob in a stowed position.

* * * * *